United States Patent [19]
Ahouanto

[11] Patent Number: 5,968,296
[45] Date of Patent: Oct. 19, 1999

[54] TIRE HAVING TWO WIRES IN EACH BEAD

[75] Inventor: Michel Ahouanto, Enval, France

[73] Assignee: Compagnie Generale des Etablissements Michelin - Michelin & Cie, Clermont-Ferrand Cedex, France

[21] Appl. No.: 09/086,163

[22] Filed: May 28, 1998

[30] Foreign Application Priority Data

May 30, 1997 [FR] France ..................... 97 06763

[51] Int. Cl.⁶ .......................... B60C 15/02; B60C 15/024; B60C 15/04; B60C 15/05
[52] U.S. Cl. .......................... 152/540; 152/516; 152/542; 152/544; 152/545
[58] Field of Search ................... 152/545, 544, 152/542, 516, 540

[56] References Cited

U.S. PATENT DOCUMENTS

| 779,730 | 1/1905 | Neary ................................ 152/544 X |
| 4,700,765 | 10/1987 | Masclaux . |
| 5,513,686 | 5/1996 | Diernaz . |

FOREIGN PATENT DOCUMENTS

| 0167283 | 1/1986 | European Pat. Off. . |
| 0770504 | 5/1997 | European Pat. Off. . |
| 2678544 | 1/1993 | France . |
| 3-243404 | 10/1991 | Japan ....................... 152/545 |
| 6-191242 | 7/1994 | Japan ....................... 152/545 |

OTHER PUBLICATIONS

Patent Abstracts of Japan, vol. 016, No. 034 (M–1204), Jan. 28, 1992 & JP 3–243404A (Yokohama Rubber Co. Ltd.), Oct. 30, 1991.

*Primary Examiner*—Adrienne C. Johnstone
*Attorney, Agent, or Firm*—Baker & Botts, L.L.P.

[57] ABSTRACT

A tire for mounting on rim with hump in which each bead:
  a) contains a main wire, around which the carcass fabric is wound, and a secondary wire placed outside the carcass fabric;
  b) the inner diameter of the main wire after mounting on the rim is greater than the diameter of the top of the hump, and its maximum elastic elongation is at most equal to 1.5%;
  c) before mounting on the rim, the outer diameter of the secondary wire is less than the inner diameter of the main wire; after mounting on the rim, the inner diameter of the secondary wire is less than the diameter of the top of the hump; the inner diameter of the secondary wire after mounting on the rim is 1.5 to 3% greater than the inner diameter of the secondary wire before mounting on the rim and the maximum elastic elongation of the secondary wire is at least 3%.

4 Claims, 2 Drawing Sheets

TIRE HAVING TWO WIRES IN EACH BEAD

BACKGROUND OF INVENTION

The present invention relates to tires and, more particularly to a tire having two wires in each bead.

It is known to provide tires with two bead wires in order to avoid rotation of the tire on the rim or to prevent loosening of the bead of the tire on a pressure loss. Such embodiments are described, for example, in EP-A 168,754 and in JP-A 5,178,033.

The tire according to EP-A 168,754 is intended to be mounted on a rim, at least one bead seat of which is axially extended inward by an axial retention projection (called hump). The bead of that tire contains two wires, one of which is close to the toe of the bead, toward the inside of the tire, and the other ensures locking of the first in case of strong axial stresses. The two wires are preferably integrated by a carcass fabric to improve that cooperation. The resistance to loosening is therefore due essentially to the action of the second wire on the first, and the anti-loosening action is not always sufficient.

JP-A 5,178,033 describes a secondary wire applied against the rim, under a main wire or beside the main wire, in order to improve radial uniformity by avoiding eccentricity defects. That requirement is not involved in the problems of loosening.

SUMMARY OF THE INVENTION

The object of the invention is to propose a tire tire usable on a rim with hump, that tire making it possible to keep the bead in place on the rim seat under extreme conditions of running at low pressure or at zero pressure in a straight line or in a marked deviation, that tire also making it possible to avoid or strongly reduce rotation of the bead on the rim in case of passage of strong power torque.

The tire tire according to the invention, usable on a standard rim with hump, has a crown, two side walls and two beads, with at least one carcass fabric extending from one bead to the other, is characterized in that each bead presents the following features:

a) it contains a main wire, around which the carcass fabric is wound, and a secondary wire placed outside the carcass fabric;

b) the inner diameter of the main wire, after mounting on the rim, is greater than the diameter of the top of the hump; the inner diameter of the main wire before mounting on the rim is practically the same as after mounting on the rim, and the maximum elastic elongation of the main wire is at most equal to 1.5%;

c) before mounting on the rim, the outer diameter of the secondary wire is less than the inner diameter of the main wire; after mounting on the rim, the inner diameter of the secondary wire is less than the diameter of the top of the hump; the inner diameter of the secondary wire after mounting on the rim is 1.5 to 3% greater than the inner diameter of the secondary wire before mounting on the rim and the maximum elastic elongation of the secondary wire is at least 3%.

The invention will be better understood by means of the following examples and figures relating to those examples.

DESCRIPTION OF PREFERRED EMBODIMENTS

Figure 1:
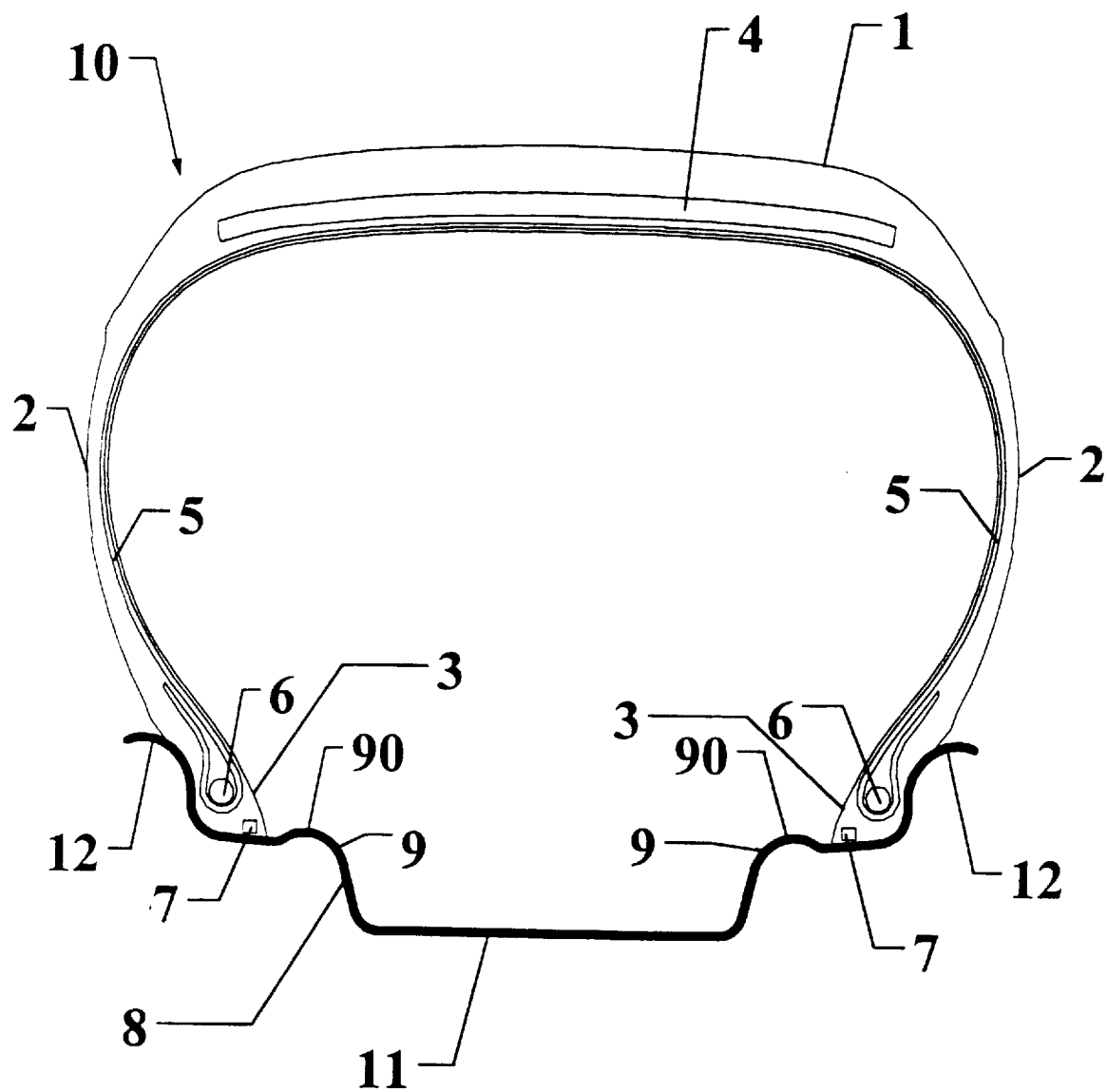
FIG. 1 represents in radial section a tire according to the invention with two beads.

A tire 10 according to the invention is shown on FIG. 1. The tire 10 has a crown 1, two side walls 2 and two beads 3. The crown 1 is reinforced by a known crown reinforcement 4, consisting, for example, of two crossed fabrics, not shown on the drawing for sake of simplification. A carcass fabric 5 passes from one bead 3 to the other by being wound in each bead around a main wire 6. Each bead 3 further contains a secondary wire 7 placed in the lower part of that bead. The tire is shown mounted on a standard rim 8 having two humps 9, each bead 3 being in contact with or in proximity to a hump 9. The rim 8 also contains a groove 11 and two rim flanges 12.

Figure 2:
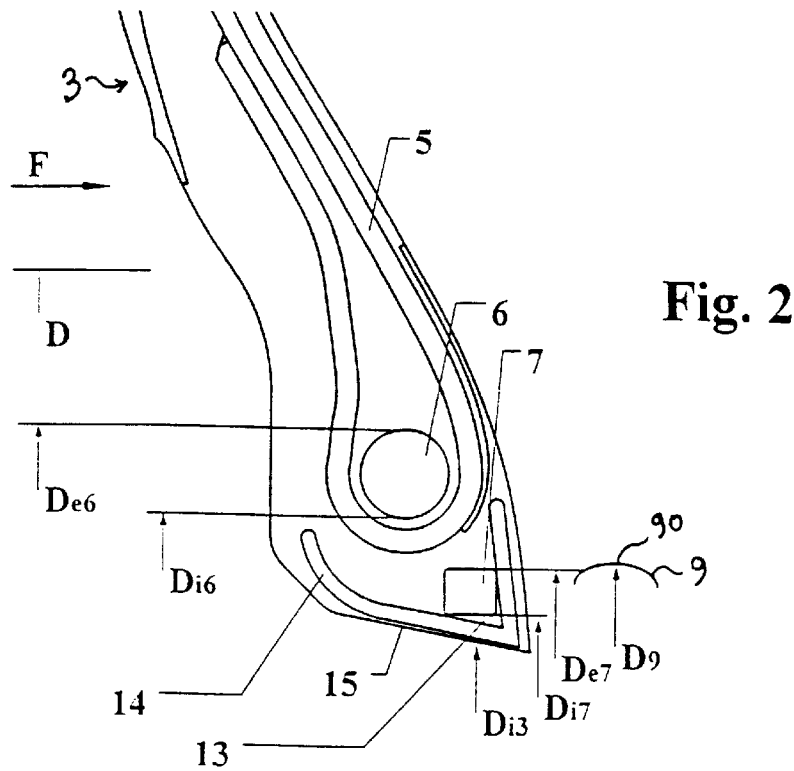
FIG. 2 represents in radial section, in greater detail, a bead of the tire of FIG. 1.

FIG. 2 represents in greater detail a bead 3 of the tire 10. The bead is assumed to be mounted on the rim 8, which is not shown in the drawing for sake of simplification. In FIG. 2, $D_9$ represents the diameter of the top 90 of the hump 9 in contact with or in proximity to the bead 3; $D_{e6}$ represents the outer diameter of the main wire 6; $D_{i6}$ represents the inner diameter of the wire 6; $D_{e7}$ represents the outer diameter of the secondary wire 7; and $D_{i7}$ represents the inner diameter of said wire 7.

Each of these diameters is the diameter of a circle having as axis the axis of rotation of the tire 10 and therefore of the rim 8, said axis, not shown in the drawing for sake of simplification, being parallel to straight line D of FIG. 2.

According to the invention, the following relations exist:

before mounting on the rim $D_{i6} > D_{e7}$ after mounting on the rim $D_{i6} > D_9$, $D_{i7} < D_9$ Furthermore, $D_{i6}$, and therefore $D_{e6}$, after mounting on the rim 8, are practically identical to the corresponding diameters of the main wire 6 before its mounting on the rim 8, that is, this wire undergoes practically no elongation on mounting of the tire 10 on the rim 8. On the other hand, the diameter $D_{i7}$ of the secondary wire 7 mounted on the rim 8 is 1.5 to 3% greater than that diameter before mounting of the tire 10 on the rim 8; that is, the wire 7 is subjected to a tensile stress after mounting. The same is true for the entire part of the bead surrounding said wire, that is, diameter $D_{i3}$ measured along the axis of rotation of the casing, in the plane perpendicular to that axis and containing the axis of the wire 7, is 1.5 to 3% greater than said diameter before mounting on the rim 8. In other words, the values of $D_{i7}$ and $D_{i3}$ after mounting on the rim are equal to 1.015–1.030 times the respective values of those diameters before mounting. The maximum elastic elongation of the main wire 6 is at most equal to 1.5%, that is, that wire is very rigid. On the other hand, the secondary wire 7 has a maximum elastic elongation at least equal to 3%, that is, it is relatively flexible and it can still be elongated after mounting on the rim 8.

The invention offers the following advantages:

The rigid main wire 6 makes possible a very effective anchoring of the carcass fabric 5 in the bead 3 and, therefore, a good rigidity of said bead. The secondary wire 7, subjected to tensile stresses when the tire 10 is mounted on the rim 8, makes possible an effective compression of the rubber 13 surrounding it against the rim 8 and, therefore, good tightness. Furthermore, when stresses are applied on the bead toward the inside of the tire, those stresses, represented by the arrow F in FIG. 2, being, for example, due to a considerable pressure loss and/or deviation or offset forces, the wire 7, already subjected to tractive forces, opposes passage over the hump 9 and, therefore, guarantees good resistance to loosening; that is, the bead 3 does not pass over the hump 9 to enter the groove 11. In fact, if the bead 3 should pass over the hump 9 and enter the groove 11 of the rim 8, a loosening would occur and the diametrically opposite part of said bead would then be able to pass over the rim flange 12, which would cause a separation from the rim.

On the other hand, the relative flexibility of the secondary wire 7 makes it possible to increase its inner diameter $D_{i7}$ with a demounting tool in order to mount the tire 10 on the rim 8 or to remove it from that rim upon demounting. It may be appropriate for that purpose to provide a protective flipper 14 between the secondary wire 7 and the inner face 15 of the bead 3, in order to prevent the demounting tool from damaging the bead 3. The flipper consists, for example, of a fabric reinforced with wires or textile fibers, and it can possibly be extended upward from inside the bead in order to increase the protection, as shown in FIG. 2. The flipper 14 is not represented in FIG. 1 for the sake of simplification.

The main wire 6 consists, for example, of metal reinforcements, notably, wires or bars, and such wire can, for example, be a standard wire of "braided" or "bundle" type. High-tenacity nonmetallic reinforcements can, however, also be used.

The relatively flexible secondary wire 7 is preferably made with nonmetallic reinforcements, such as, for example, high-tenacity carbon or organic polymer fibers, notably, aramide. The tension modulus of the secondary wire 7 is at least equal to 10,000 MPa (megapascals) in order to guarantee good resistance to loosening.

Preferably, the maximum elastic elongation of the secondary wire 7 is at least equal to 4%.

The term "fiber" is to be construed in a very general sense, as a fiber consisting of a single monofilament or an assembly of Filaments such as a multi-filament fiber or a group of such twisted fibers, notably forming cables or cords.

EXAMPLES OF EMBODIMENTS

A radial tire of dimension 175-7CR13 is made according to the invention. The characteristics of that tire and of the rim on which it is mounted are as follows:
Main Wire 6

This is a braided steel wire whose ultimate stress is 2 tons. Its maximum elastic elongation is 1.4%. The diameter $D_{i6}$ before and after mounting on the rim 8 is 333.6 mm and 334.9 mm respectively.

Increase of the diameter $D_{i6}$ after mounting on the rim 8 is 0.4%, that is, it is weak.
Secondary Wire 7

This wire is obtained by winding 11 turns of an aramide reinforcing fiber. The traction modulus of the wire thus obtained is 20,000 MPa. Diameter $D_{e7}$ and diameter $D_{i7}$ of said wire before mounting are 331 mm and 323 mm, respectively. The values of said diameters after mounting on the rim 8 are 337.6 mm and 329.6 mm. The increase of diameter $D_{i7}$ after mounting on the rim 8 is therefore 2%. The maximum elastic elongation of that secondary wire is 4%.
Rim 8

The rim corresponds to the designation 5J13 of the European Tyre and Rim Technical Organization (ETRTO). The value of diameter $D_9$ is 330.08 mm and the seat diameter (symbol $D_H$ of the ETRTO) is 328.07 mm.

A control tire not conforming to the invention is also made. Such tire is identical to the tire according to the invention, with the difference that it does not contain any secondary wire 7. These two tires have the same outer geometry and, therefore, the value of diameter $D_{i3}$ is the same for both tires, diameter $D_{i3}$ of the control tire being measured in the same place on the tire as for the tire according to the invention. Said diameter $D_{i3}$, before mounting on the rim 8, is equal to 321 mm and is less than diameter $D_{i3}$ of a standard tire of the same size (325.3 mm), which makes it possible to measure tires of identical sizes, said two tires therefore undergoing more marked tightening on the rim than a standard tire of that size.

Said tires are mounted on the same rim 8. One then finds that the pressures are as follows to make mounting of the tires possible:

tire conforming to the invention: 4.4 bars for passing over the hump outside the vehicle;

tire not conforming to the invention: 2.6 bars for over passing the hump outside the vehicle.

These rims are observed mounted on a vehicles and are run at 50 km/h on a radius of 20 m, reducing the pressure until the appearance of loosening. One finds that the loosening pressure is 0 bar for the tire according to the invention, while it is 1 bar for the control tire. The tire according to the invention therefore undergoes loosening only in an extreme case of deflation, when there is no longer any pressure in the tire, while the tire not conforming to the invention undergoes loosening well before, while notable pressure exists in the tire, despite a greater tightening than in a standard tire, as observed above. The invention therefore makes it possible to delay the occurrence of loosening very substantially and thus delay the phenomenon of separation from the rim very notably, which considerably improves the safety of that tire, at the cost of a slight inconvenience, which is higher pressure for mounting the tire according to the invention.

Figure 3:
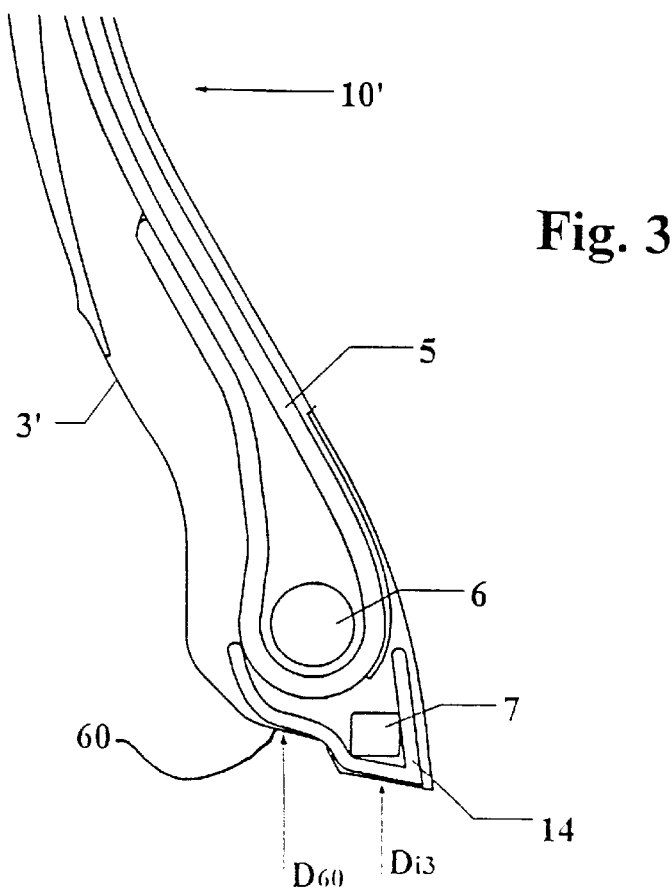
FIG. 3 represents in radial section a bead of another tire according to the invention.

FIG. 3 represents another embodiment of the invention. In said figure, the bead 3' of that tire 10' is identical to the bead 3 of tire 10, with the difference that tire 3' has an area 60, under the main wire 6, whose average diameter $D_{60}$ before mounting on the rim 8 is greater than diameter $D_{i3}$ before mounting and practically corresponds to the diameter of a standard tire measured in the same place on the tire. The importance of this embodiment lies in having an inflation pressure for passage of the hump which comes close to that pressure for a standard tire, while being greater, however, which can facilitate mounting, compared to tire 8, which does not contain said area 60.

For simplification of the drawing, the indications are the same in FIGS. 2 and 3 for the same elements.

The invention is, of course, not limited to the embodiments described above.

I claim:

1. A tire for mounting on a standard rim with hump and having a crown, two side walls, two beads, and at least one carcass fabric extending from one bead to the other, characterized in that each bead:

a) contains a main wire around which the carcass fabric is wound, and a secondary wire placed outside the carcass fabric;

b) the inner diameter of the main wire after mounting on the rim is greater than the diameter of the top of the hump; the inner diameter of the main wire before mounting on the rim is practically the same as after mounting on the rim, and the maximum elastic elongation of the main wire is at most equal to 1.5%;

c) before mounting on the rim, the outer diameter of the secondary wire is less than the inner diameter of the main wire; after mounting on the rim, the inner diameter of the secondary wire is less than the diameter of the top of the hump; the inner diameter of the secondary wire after mounting on the rim is 1.5 to 3% greater than the inner diameter of the secondary wire before mounting on the rim and the maximum elastic elongation of the secondary wire is at least 3%.

2. A tire tire according to claim 1, characterized in that the maximum elastic elongation of the secondary wire is at least equal to 4%.

3. A tire according to claim 1, characterized in that the secondary wire is formed by winding turns of a single reinforcing monofilament or of an assembly of reinforcing filaments.

4. A tire according to claim 1, characterized in that the bead of the tire has an area, under the main wire, whose average diameter, before mounting on the rim, is greater than the diameter of the tire under the axis of the second wire, before mounting on the rim.

* * * * *